(12) United States Patent
Udani (10) Patent No.: US 8,584,187 B2
(45) Date of Patent: Nov. 12, 2013

(54) BANDWIDTH MANAGEMENT

(75) Inventor: Sanjay K. Udani, Arlington, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 357 days.

(21) Appl. No.: 12/732,251

(22) Filed: Mar. 26, 2010

(65) Prior Publication Data

US 2011/0239259 A1 Sep. 29, 2011

(51) Int. Cl.
*H04N 7/173* (2011.01)

(52) U.S. Cl.
USPC .............................. 725/95; 725/82; 725/116

(58) Field of Classification Search
USPC .................... 725/80, 74, 85, 82, 119
See application file for complete search history.

(56) References Cited

U.S. PATENT DOCUMENTS

| | | | |
|---|---|---|---|
| 6,169,570 B1 | 1/2001 | Suzuki | |
| 6,469,982 B1 * | 10/2002 | Henrion et al. | 370/230 |
| 6,646,988 B1 * | 11/2003 | Nandy et al. | 370/235 |
| 6,816,456 B1 * | 11/2004 | Tse-Au | 370/230.1 |
| 7,394,985 B1 | 7/2008 | Wang et al. | |
| 7,630,314 B2 * | 12/2009 | Dos Remedios et al. | 370/235 |
| 8,116,317 B2 * | 2/2012 | Zuberi | 370/395.42 |
| 2003/0133476 A1 * | 7/2003 | Stone et al. | 370/537 |
| 2004/0028054 A1 * | 2/2004 | Khurana et al. | 370/395.21 |
| 2004/0031056 A1 | 2/2004 | Wolff | |
| 2004/0190528 A1 * | 9/2004 | Dacosta | 370/395.41 |
| 2005/0286559 A1 * | 12/2005 | Miernik et al. | 370/468 |
| 2006/0153214 A1 * | 7/2006 | Moore et al. | 370/401 |
| 2006/0215650 A1 * | 9/2006 | Wollmershauser et al. | 370/389 |
| 2007/0027983 A1 * | 2/2007 | Bowra et al. | 709/224 |
| 2007/0058612 A1 * | 3/2007 | Bushmitch | 370/352 |
| 2008/0232250 A1 | 9/2008 | Park | |
| 2008/0310301 A1 * | 12/2008 | Wade et al. | 370/230 |
| 2008/0313666 A1 | 12/2008 | Evenson | |
| 2008/0320540 A1 * | 12/2008 | Brooks et al. | 725/118 |
| 2009/0074007 A1 * | 3/2009 | Yonge et al. | 370/468 |
| 2010/0011390 A1 | 1/2010 | Coles et al. | |
| 2010/0050215 A1 | 2/2010 | Wester et al. | |
| 2011/0162013 A1 * | 6/2011 | Bagasra et al. | 725/74 |
| 2011/0270987 A1 * | 11/2011 | Schlansker et al. | 709/226 |

* cited by examiner

*Primary Examiner* — James R Sheleheda (57) ABSTRACT

A device may include a memory to store parameters associated with allocating bandwidth. The bandwidth may be allocated among at least a local class of traffic and a network class of traffic, and a portion of the bandwidth may be shareable between the local and network classes of traffic. The device may also include a communication interface to receive requests for access to bandwidth from a number of devices, the devices including at least one set top box (STB) and at least one digital video recorder (DVR). The device may also include logic to receive a first request having a corresponding first bandwidth and being associated with a first class of traffic, and determine whether the first bandwidth plus currently used bandwidth associated with the first class of traffic is less than a reserved bandwidth associated with the first class of traffic. The logic may also be configured to approve the first request when the first bandwidth plus currently used bandwidth associated with the first class of traffic is less than the reserved bandwidth associated with the first class of traffic. The logic may be further configured to forward the first request to a second device to determine whether a portion of the shareable bandwidth is available to fulfill the request, when the first bandwidth plus the currently used bandwidth associated with the first class of traffic is not greater than a maximum bandwidth associated with the first class of traffic.

17 Claims, 10 Drawing Sheets

BANDWIDTH MANAGEMENT

BACKGROUND INFORMATION

Service providers offer customers a wide range of telecommunication services, including video, telephony and data services. Customer locations, such as a customer's home, often include many user devices that simultaneously access these services.

For example, multiple user devices within a home may simultaneously attempt to access the Internet, watch a video, etc. As a result, home networks that allow users to share access to these services are becoming increasingly complex.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to managing bandwidth and/or other limited resources in a customer's home network. In one exemplary implementation, one or more devices that may be located in the customer's home network may actively manage bandwidth allocation in the customer's home network. In such an implementation, the home management device may make some decisions to grant/deny requests for bandwidth without consulting the service provider. In other instances, the management of the bandwidth may be shared between the service provider and the user's home management device. In each case, the bandwidth may be managed in accordance with pre-defined service levels associated with the particular customer's service and/or parameters associated with a customer's home network.

Figure 1:
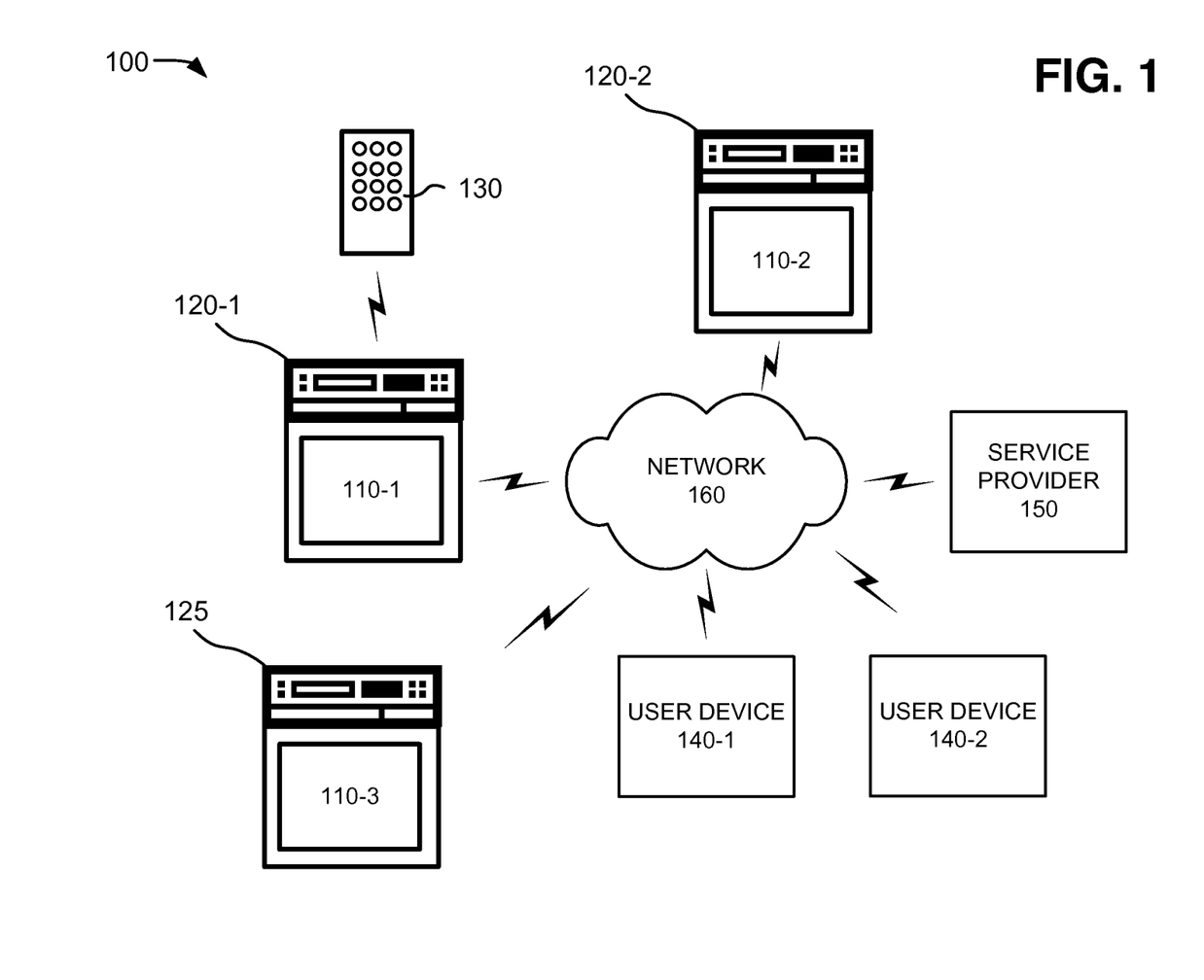
FIG. 1 illustrates an exemplary network in which systems and methods described herein may be implemented.

FIG. 1 is a diagram of an exemplary network 100 in which systems and methods described herein may be implemented. As illustrated, network 100 may include televisions (TVs) 110-1 to 110-3 (collectively "televisions 110" and individually "television 110"), STBs 120-1 and 120-2 (collectively "STBs 120" and individually "STB 120"), a digital video recorder (DVR) 125, a remote control 130, user devices 140-1 and 140-2 (collectively "user devices 140" and individually "user device 140"), a service provider 150 and network 160. Components of network 100 may interconnect via wired and/or wireless connections.

Televisions 110 may include any display device capable of displaying video content provided by STB 120, DVR 125, and/or content provided by other devices (e.g., a digital video disk (DVD) player, a video camera, a home media player, etc., not shown) connected to television 110.

STBs 120 and DVR 125 may include devices that receive television programming (e.g., from service provider 150), and provide the television programming to television 110 or another device. STBs 120 and DVR 125 may allow users to alter the programming provided to television 110 based on a signal (e.g., a channel up or channel down signal, etc.) from remote control 130 and/or user device 140. Furthermore, DVR 125 may record video in a digital format to a disk drive or other memory medium within DVR 125. In one exemplary implementation, features of STBs 120 and/or DVR 125 may be incorporated directly within televisions 110. Consistent with implementations described herein, STBs 120 and DVR 125 may be configured to display content stored on another one of STBs 120 and/or DVRs 125. This feature may be referred to as a "multi-room DVR" (MDVR). The terms "set top box" and "digital video recorder" as used herein should be construed to include any device used to receive signals from an external source and output the signals for viewing or playing, Remote control 130 may include a device that allows a user to control programming and/or content displayed on television 110 via interaction with STBs 120 and/or DVR 125. Furthermore, remote control 130 may facilitate interaction with selecting and/or order various content that may be displayed on an interactive media guide (IMG).

User devices 140 may each include a laptop or notebook computer, a personal computer (PC), an ultra mobile personal computer (UMPC), a netbook, or other types of computation or communication devices, threads or processes running on these devices, and/or objects executable by these devices. User device 140 may also include any type of communication device, such as a plain old telephone system (POTS) telephone, a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a PDA that can include a radiotelephone, or the like), etc a mobile telephone (e.g., a cell phone), a smart phone (e.g., that may combine a cellular radiotelephone with data processing and data communications capabilities), a personal digital assistant (PDA) (e.g., that can include a radiotelephone, a pager, Internet/intranet access, etc. In one implementation, user device 140 may include any device (e.g., an Internet Protocol (IP)-based device) that is capable of accessing services (e.g., Internet services) provided by service provider 150 via network 160. In other implementations, user device 140 may be configured to interact with STBs 120, DVR 125, and/or television 110, via a local network (e.g., a home wired or wireless network). User devices 140 may connect to network 160 via wired, wireless, or optical connections.

Service provider 150 may include one or more computing devices, servers and/or backend systems that are able to connect to network 160 and transmit and/or receive information via network 160. In one implementation, service provider 150 may include a server (e.g., a computer system or an application), a cable head-end, or a broadcaster capable of providing content (e.g., TV programming, movies, on-demand services, live television, news feeds, blog feeds, widgets, applications, etc.), advertisements, instructions, codes, encryption keys, and/or other information associated with products and/or services, etc., to STBs 120 and/or DVR 125. In an exemplary implementation, service provider 150 may forward or provide Internet protocol television (IPTV) programming to user devices 140 via network 160. In some implementations, service provider 150 may be configured to receive information from STBs 120, DVR 125, televisions 110, user devices 140, or other devices in network 100, as described in detail below.

Network 160 may include one or more wired, wireless and/or optical networks that are capable of receiving and transmitting data, voice and/or video signals, including multi-media signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, although three televisions 110, two STBs 120, one DVR 125, one remote control 130, two user devices 140, one service provider 150, and one network 160 have been illustrated in FIG. 1, in practice, there may be more televisions 110, STBs 120, DVRs 125, remote controls 130, user devices 140, service providers 150, and/or networks 160. Network 100 may also include additional elements, such as switches, gateways, routers, backend systems, etc., that aid in routing information, such as media streams from service provider 150 to STBs 110 and/or DVR 125. Also, in some instances, one or more of the components of network 100 may perform one or more functions described as being performed by another one or more of the components of network 100.

Figure 2:
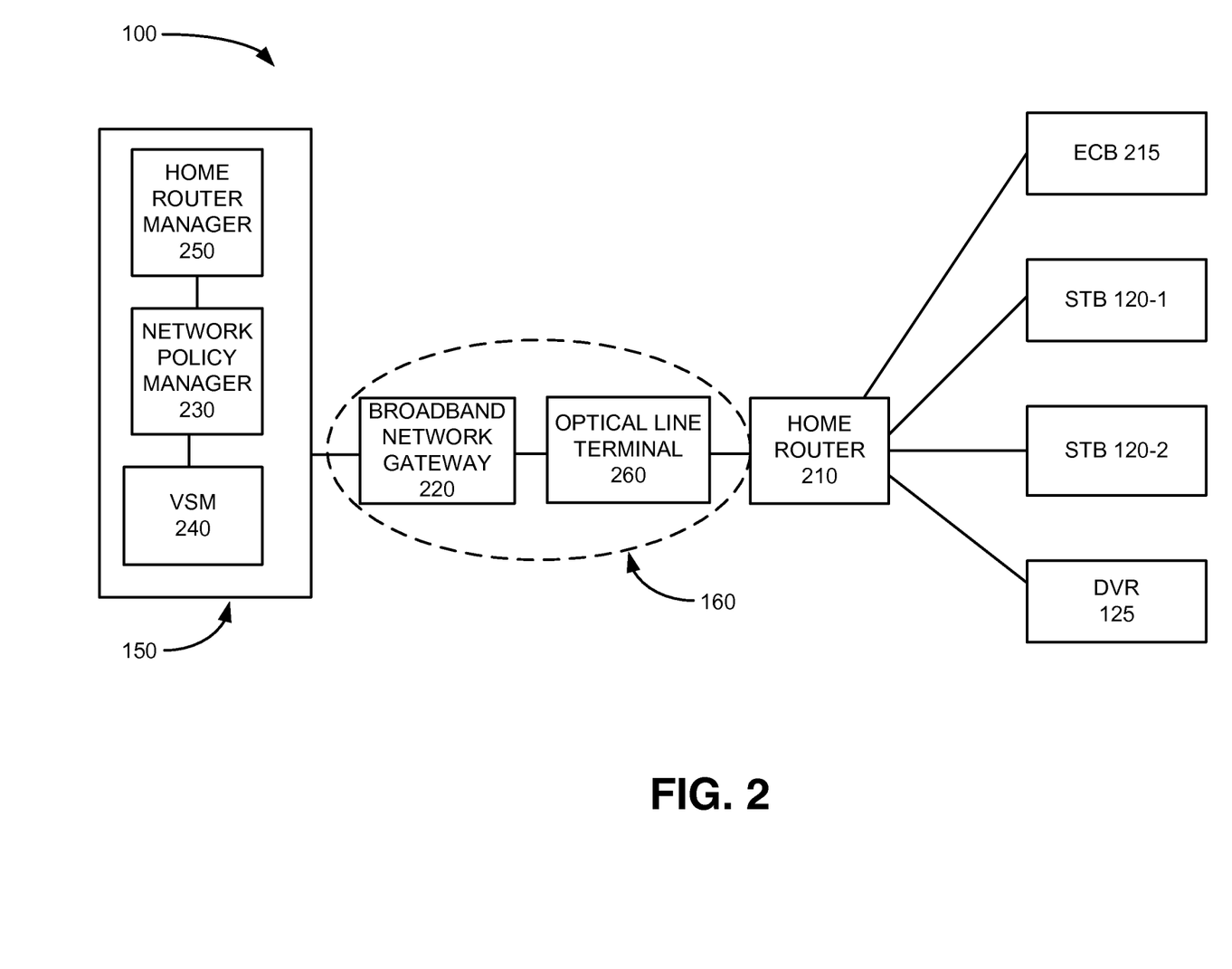
FIG. 2 illustrates an exemplary configuration of components implemented in the network of FIG. 1.

FIG. 2 illustrates exemplary components implemented in a portion of network 100. Referring to FIG. 2, network 100 may include home router 210, Ethernet coax bridge (ECB) 215, broadband network gateway (BNG) 220, network policy manager (NPM) 230, video service manager (VSM) 240, home router manager (HRM) 250 and optical line terminal (OLT) 260. User devices 140 are not illustrated in FIG. 2 for simplicity.

In an exemplary implementation, home router 210, ECB 215, STBs 120 and DVR 125 are located at a customer premises, such as a customer's home. In one implementation, STBs 120 and DVR 125 may be connected to each other and home router 210 via a wired connection, such as a multimedia over coax (MOCA) connection. Other devices in the home network, such as user devices 140, may connect to home router 210 via the MOCA connection using ECB 215 or another wired connection or interface device. Other devices in the home network, such as user devices 140, may also connect to home router 210 via wireless connections (e.g., WiFi, Bluetooth, etc.).

Home router 210, also referred to herein as broadband home router (BHR) 210 or home network gateway (HNG) 210, may act as a hub for communications entering the customer's premises. For example, service provider 150 may communicate with one or more of the devices in a customer's home via network 160 to BHR 210. Similarly, BHR 210 may communicate with one or more devices at service provider 150 and OLT 260 via network 160. BHR 210 may also communicate with STBs 120, DVR 125 and user devices 140 (not shown in FIG. 2) to manage bandwidth usage within the customer's home, as described in detail below.

ECB 215 may include a bridge or other network device that allows devices in the customer's home/home network to connect to home router 210 using an Ethernet protocol. For example, devices in the customer's home may receive and/or transmit content, such as video, music or multi-media content via ECB 215 using a MOCA connection.

BNG 220, also referred to herein as gateway router 220, may be located at service provider 150 or elsewhere in network 100. BNG 220 may facilitate communications between service provider 150 and BHR 210. For example, BNG 220 may transmit media streams from service provider 150 to BHR 210 via network 160. BNG 220 may also receive requests and other information from a customer premises transmitted by BHR 210 via network 160, as also described in detail below.

Service provider 150 may include NPM 230, VSM 240 and HRM 250. NPM 230 may store business policy information associated with managing a large number of customer locations (e.g., thousands of customer locations). For example, NPM 230 may store information regarding various levels of service offered to customers. As an example, a first level of service may provide Internet services with a predetermined bandwidth, download speed and/or upload speed. The first level of service may also provide television/video services that allow for a certain bandwidth, a number of shows/movies to be simultaneously downloaded and/or viewed, etc. Different levels of service may be provided based on the particular subscription level. In each case, NPM 230 may monitor customer locations to provide the appropriate service level.

VSM 240 may manage video services, such as video-on-demand (VOD) services for customers. For example, VSM 240 may provide movies and/or televisions shows in response to requests from users input via the IMG displayed on one of televisions 110 via STBs 120 and/or DVR 125. Policy manager 230 and VSM 240 may interact to ensure that services provided to a customer premises meet the service level associated with that particular customer. HRM 250 may interact with NPM 230 to manage customer's home routers, such as BHR 210. For example, HRM 250 may forward bandwidth parameters to BHR 210 in accordance with a customer's service level, as described in detail below.

OLT 260 may be located at a central office associated with service provider 150. OLT 260 may interface with BHR 210, optical network terminals (ONTs) and/or other devices (e.g., modems) located at a customer premises. For example, OLT 260 may interface with BHR 210 located at the customer's home. In an exemplary implementation, OLT 260 may include network policy logic for managing bandwidth associated with IPTV provided to a customer's home, as described in detail below. In some implementations, service provider 150 may forward programming to BHR 210 via BNG 220 and OLT 260. In such implementations, OLT 260 may forward optical signals to BHR 210, which may act as an optical network terminal (ONT) for the customer's home network.

Figure 3:
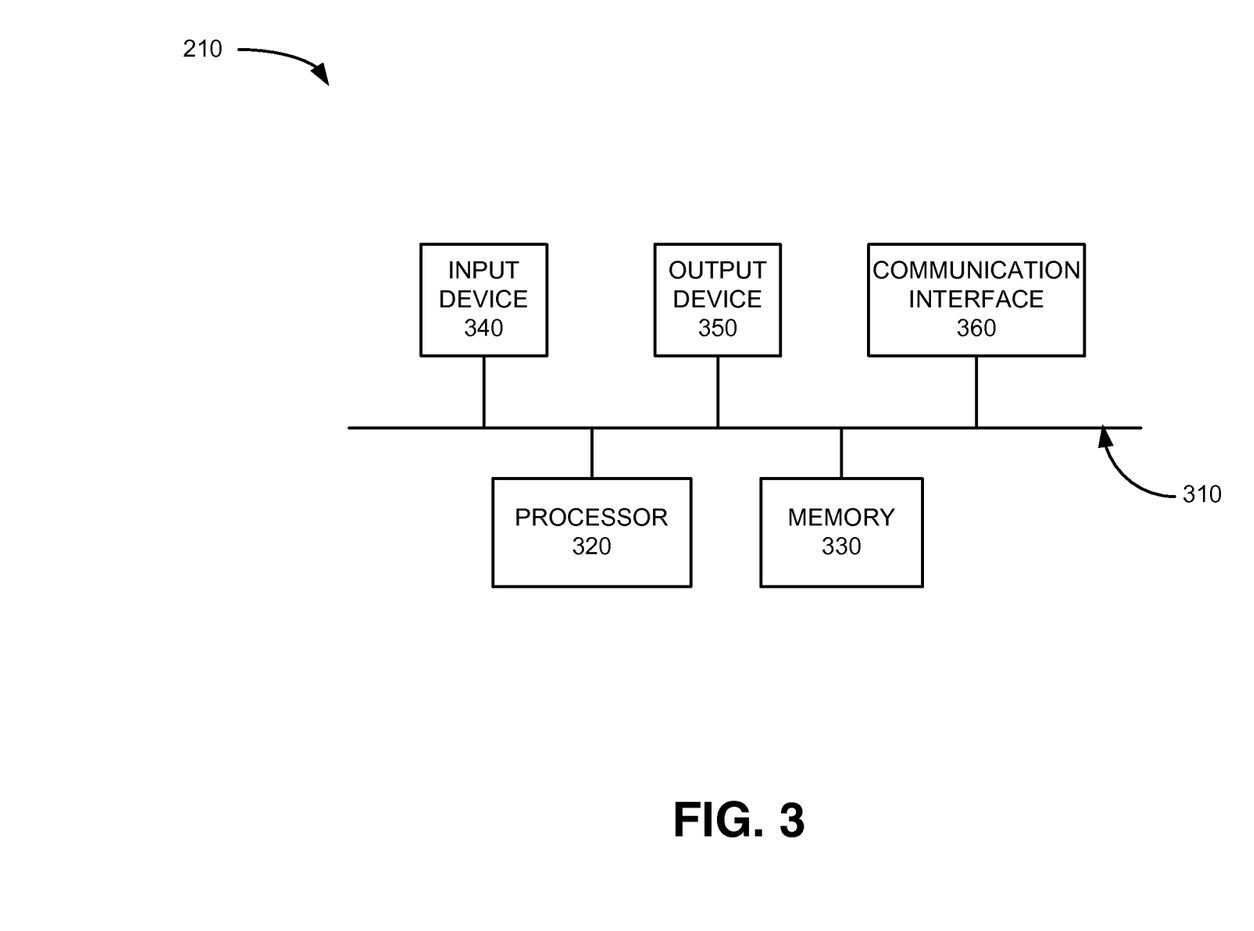
FIG. 3 illustrates an exemplary configuration of one or more of the components of FIG. 2.

FIG. 3 illustrates an exemplary configuration of home router (BHR) 210. One or more of STBs 120, DVR 125, service provider 150, gateway router 220, NPM 230, VSM 240, HRM 250 or OLT 260 may be configured in a similar manner. Referring to FIG. 3, BHR 210 may include a bus 310, a processor 320, a memory 330, an input device 340, an output device 350 and a communication interface 360. Bus 310 may include a path that permits communication among the elements of BHR 210.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to BHR 210, such as a keyboard, a keypad, a mouse, a pen, a microphone, a touch screen, voice recognition and/or biometric mechanisms, etc. Input device 340 may also include mechanisms for receiving input via a remote control device, such as remote control 130, which may send commands to BHR 210 via IR or radio frequency signals. Output device 350 may output information to the user and may include a display, a printer, a speaker, etc.

Communication interface 360 may include one or more transceivers that BHR 210 may use to communicate with other devices in a customer premises or at service provider 150. For example, communication interface 360 may include mechanisms for communicating with STBs 120, DVR 125, user devices 140, ECB 215, BNG 220 and OLT 260 via wired, wireless or optical mechanisms. Communication interface 360 may also include one or more radio frequency (RF) transmitters, receivers and/or transceivers and one or more antennas for transmitting and receiving RF data via network 160. Communication interface 360 may also include a modem or an Ethernet interface to a LAN or other mechanisms for communicating via a network, such as network 160 or another network via which BHR 210 communicates with other devices/systems.

The exemplary configuration illustrated in FIG. 3 is provided for simplicity. It should be understood that BHR 210 (and one or more of STBs 120, DVR 125, service provider 150, ECB 215, gateway router 220, NPM 230, VSM 240, HRM 250 or OLT 260) may include more or fewer devices than illustrated in FIG. 3. For example, various modulating, demodulating, coding and/or decoding components, one or more power supplies or other components may be included in BHR 210.

BHR 210 may perform processing associated with interacting with STBs 120, DVR 125, user devices 140, service provider 150, ECB 215 and other devices in network 100. For example, BHR 210 may perform processing associated with managing a user's home network. BHR 210 may perform these operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
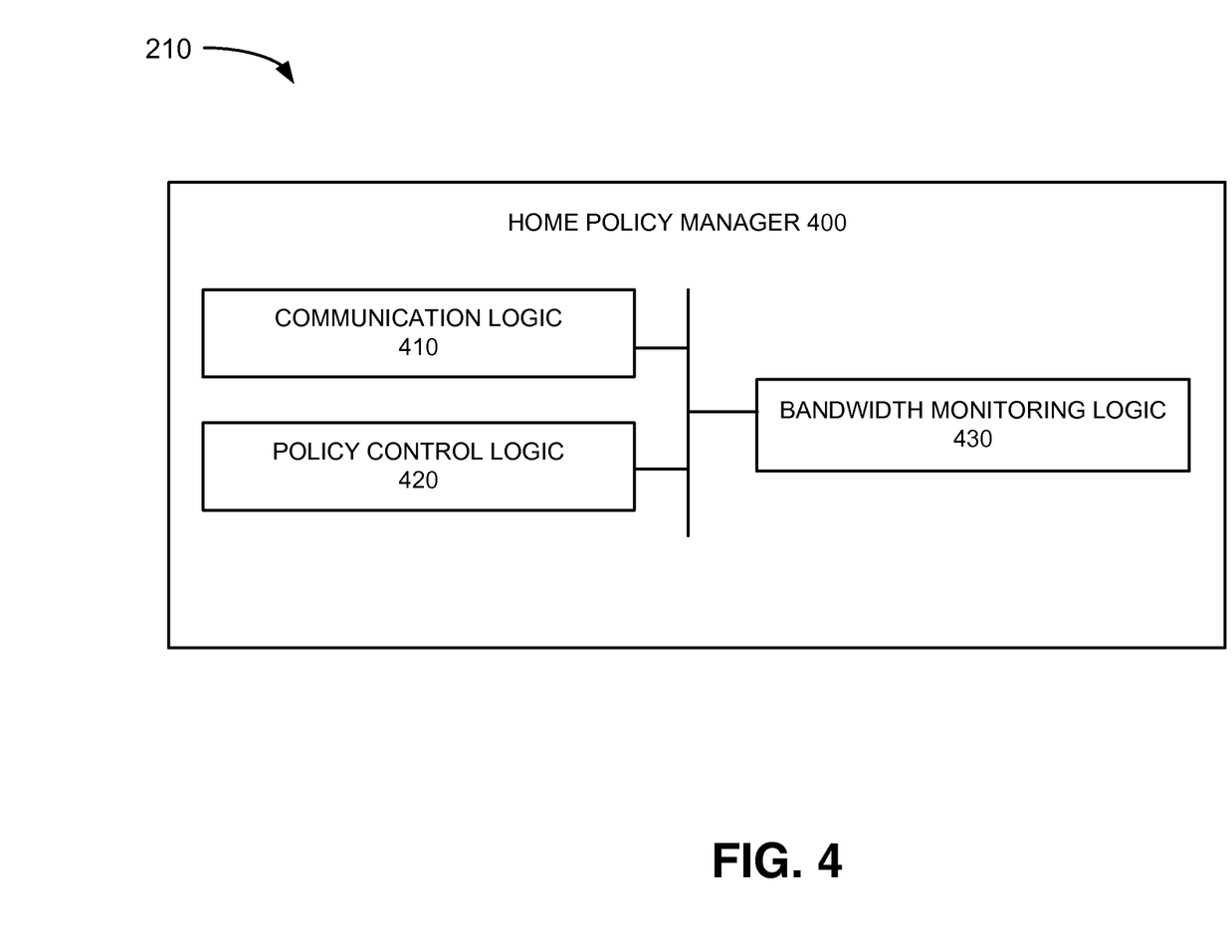
FIG. 4 illustrates an exemplary configuration of logic components implemented in one of the devices of FIG. 2.

FIG. 4 is an exemplary functional block diagram of components implemented in BHR 210 of FIG. 3. In an exemplary implementation, all or some of the components illustrated in FIG. 4 may be stored in memory 330. For example, all of some of the components associated with home policy manager (HPM) 400 may implemented by processor 320 executing software instructions stored in, for example, memory 330.

Referring to FIG. 4, HPM 400 may include communication logic 410, policy control logic 420 and bandwidth monitoring logic 430. HPM 400 and its various logic components are shown in FIG. 4 as being included in HBR 210. In alternative implementations, these components or a portion of these components may be located externally with respect to HBR 210. For example, in some implementations, one or more of the components of HPM 400 may be located in devices external to BHR 210, such as in one of STBs 120, DVR 125 or another device. In still other implementations, one or more of the components illustrated in FIG. 4 may be located at service provider 150 and/or OLT 260.

Communication logic 410 may include logic for communicating with other devices in network 160. For example, communication logic 410 may receive requests for bandwidth from one of STBs 110 and/or DVR 125. Communication logic 410 may forward these requests to policy control logic 420, which may deny or grant the request, as described in more detail below. Communication logic 410 may also receive information, such as responses to requests, data streams, etc., from service provider 150 via BNG 220.

Policy control logic 420 may include logic for managing a user's home network based on various policies stored in BHR 210. For example, policy control logic 420 may receive policy information from NPM 230 upon boot-up of BHR 210. NPM 230 may periodically update this information when changes occur in network 100, such as when a customer changes his/her level of service. Policy control logic 420 may store these parameters and manage the customer's bandwidth usage, as described in more detail below. For example, policy control logic 420 may allocate a certain amount of bandwidth within the home premises/network for different classes of traffic. As an example, policy control logic 420 may allocate a certain amount of bandwidth for local video traffic from DVR 125 to STBs 120.

Bandwidth monitoring logic 430 may include logic to monitor a number of parameters associated with available bandwidth in a customer's home premises/network. For example, as described above, a customer may subscribe to a certain level of service provided by service provider 150. Bandwidth monitoring logic 430 may track the customer's bandwidth usage in accordance with the appropriate level of service. In an exemplary implementation, bandwidth monitoring logic 430 may track bandwidth usage corresponding to difference classes of traffic (e.g., local traffic, network traffic, best effort traffic, etc.).

In an exemplary implementation, services within network 100 may be categorized into two or more types. A first type of service may include best effort services which may offer no quality of service (QoS) guarantee and may also require no resource reservation within network 100. Best effort services may include Internet services/traffic. A second class of service may include managed services, such as network services. Managed services may require some negotiation between devices in network 100, as described in detail below.

Figure 5:
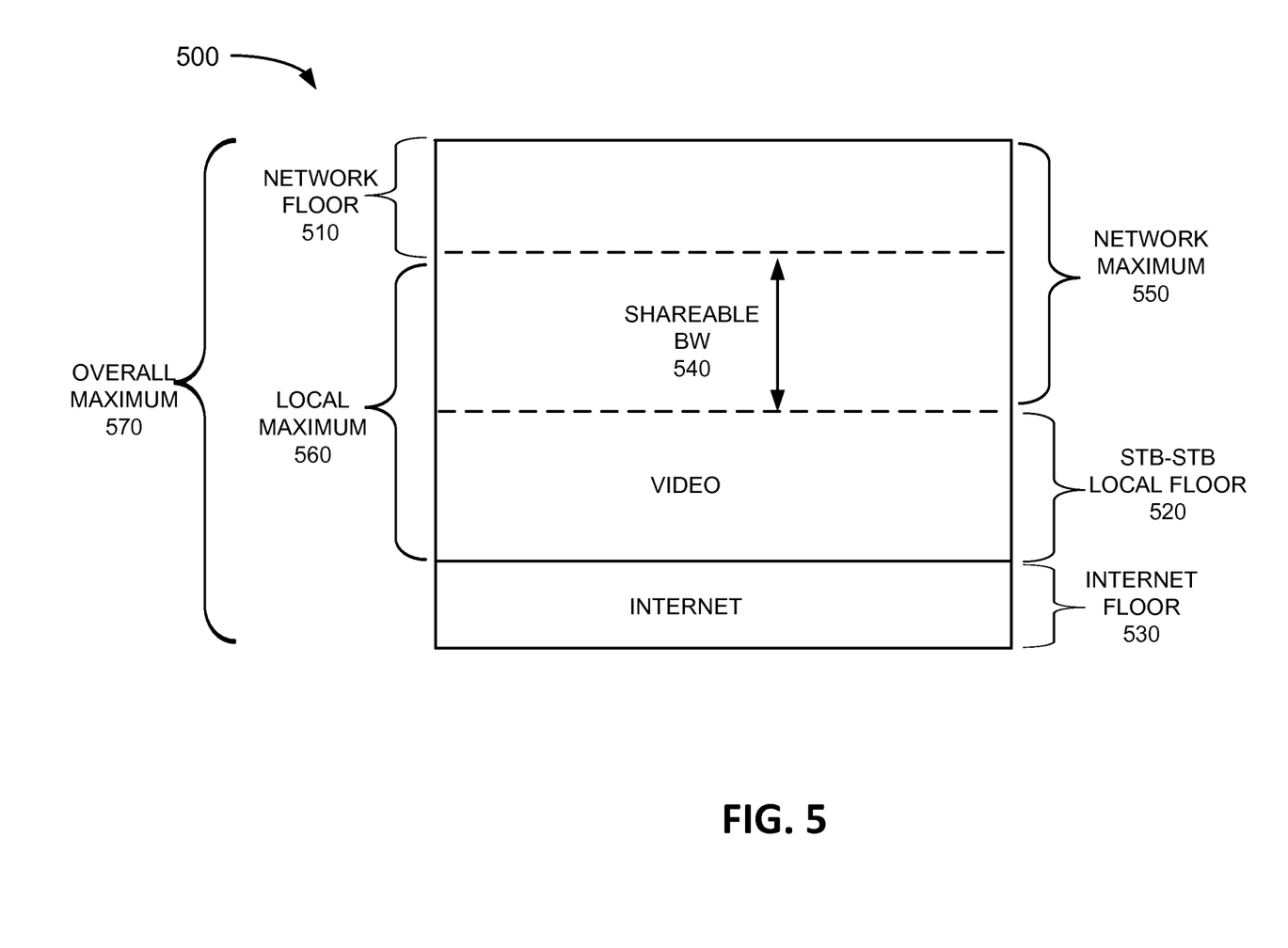
FIG. 5 is a schematic diagram illustrating portions of bandwidth for use by components illustrated in FIG. 2.

FIG. 5 schematically illustrates various bandwidth (BW) parameters associated with a user's home network. Referring to FIG. 5, block 500 includes network floor bandwidth 510, STB to STB local floor bandwidth 520, Internet floor bandwidth 530, shareable bandwidth 540, network maximum bandwidth 550, local maximum bandwidth 560 and overall maximum bandwidth 570.

Network floor BW 510 may represent the minimum bandwidth reserved for network traffic to the customer's home network. Network traffic may include video traffic, such as video-on-demand traffic and IPTV traffic, as well as other traffic provided by service provider 150 or other entities in network 100 that may be managed within network 100. STB-STB local floor BW 520 (labeled video in FIG. 5) may represent the minimum bandwidth reserved for traffic between STBs 120 and DVR 125 in a customer's home network. For example, local floor BW 520 may include bandwidth associated with viewing video programming at one of STBs 120 that is stored on DVR 125 (e.g., a multi-room DVR).

Internet floor BW 530 may represent the minimum bandwidth reserved for Internet traffic or best effort traffic associated with any number of devices, such as user devices 140, ECB 215, STBs 120, DVR 125, attempting to access bandwidth. For example, Internet floor BW 530 may include BW reserved for surfing the web, downloading information, uploading information, etc. In an exemplary implementation, Internet traffic and/or best effort traffic may represent traffic which offers no QoS guarantee and requires no resource reservation within network 100. Reserving a predetermined amount of Internet or best effort bandwidth may ensure that a user's activities, such as Internet web browsing via one of user devices 140 is not starved while STBs 110 and/or DVR 125 are actively consuming bandwidth. In addition, Internet floor BW 530 may ensure that service provider 150 provides the appropriate level of data services to the customer.

Shareable BW 540 (shown between the dotted lines) may represent the bandwidth that is shareable between network traffic, local traffic (e.g., STB-STB traffic) and/or Internet traffic. Bandwidth monitoring logic 430 may adjust the available shareable BW 430, as well as the currently used BW associated with local traffic, network traffic and Internet traffic as bandwidth is being used/consumed, as described in detail below.

Network maximum BW 550 may represent the maximum network bandwidth available to a customer. In one implementation, the network maximum BW 550 may be the sum of network floor BW 510 and shareable BW 540 (e.g., 510+540). Local maximum BW 560 may represent the maximum bandwidth available for local traffic in a customer's home network. In one implementation, local maximum BW 560 may be the sum of local floor BW 520 and shareable BW 540 (e.g., 520+540). As described above, in an exemplary implementation, video traffic may include VOD traffic from VSM 1240 to DVR 125 and STBs 120 (e.g., VOD traffic on the MOCA medium connecting BHR 210 to DVR 125 and STBs 120), as well as IPTV traffic.

In conventional systems, a network management device may set predetermined bandwidth limits for each type of traffic. For example, in a conventional system, 10 Mb/s may be reserved for local traffic, 20 Mb/s may be reserved for network traffic (e.g., VOD traffic), etc. Such approaches, however, inefficiently allocate the available bandwidth. In accordance with an exemplary implementation, the bandwidth parameters illustrated in FIG. 5 may be allocated among various classes of traffic to allow more efficient use of bandwidth, as described in detail below.

Figure 6A:
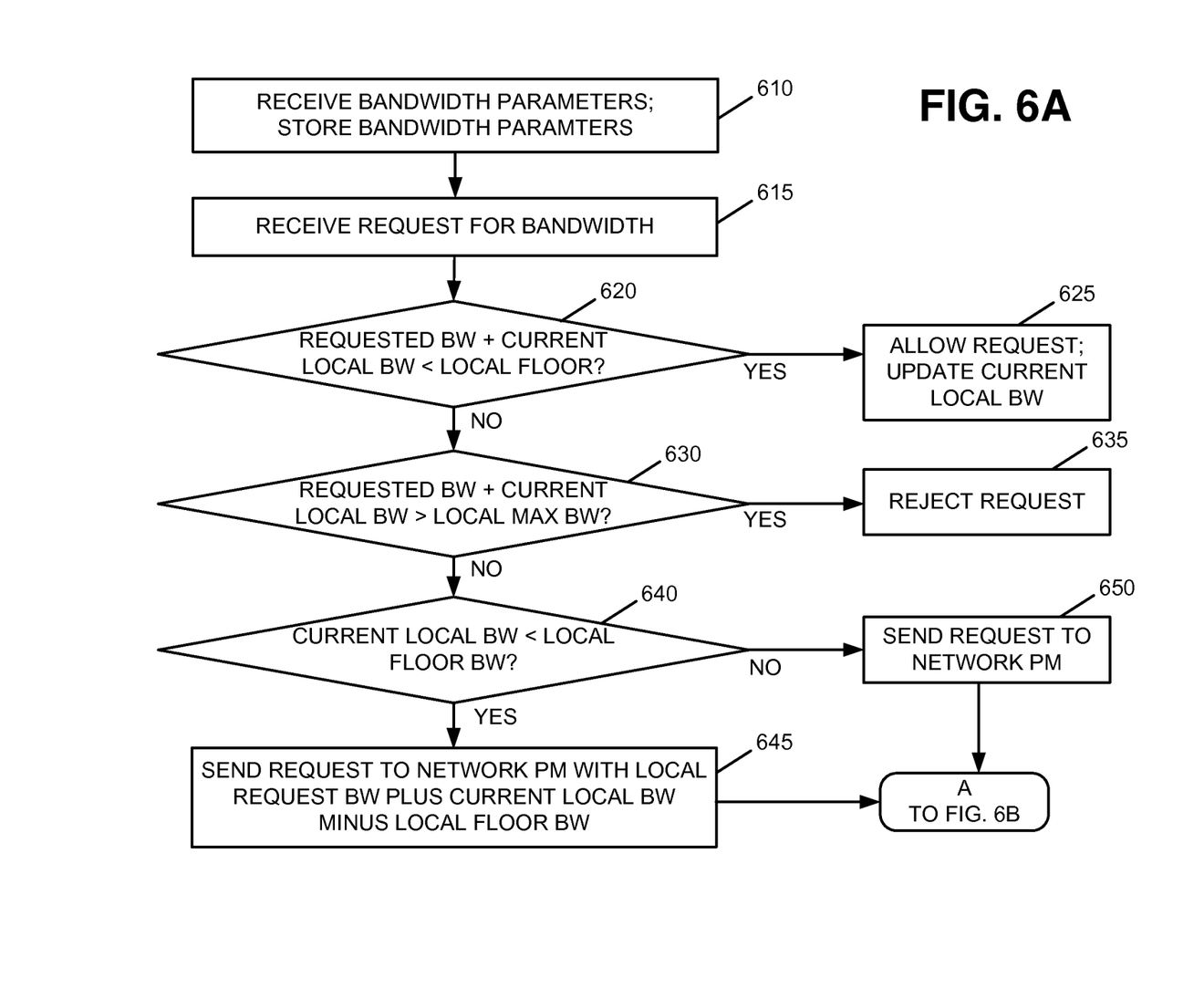
FIGS. 6A and 6B are flow diagrams illustrating exemplary processing by devices illustrated in FIG. 2 in accordance with an exemplary implementation.
Figure 6B:
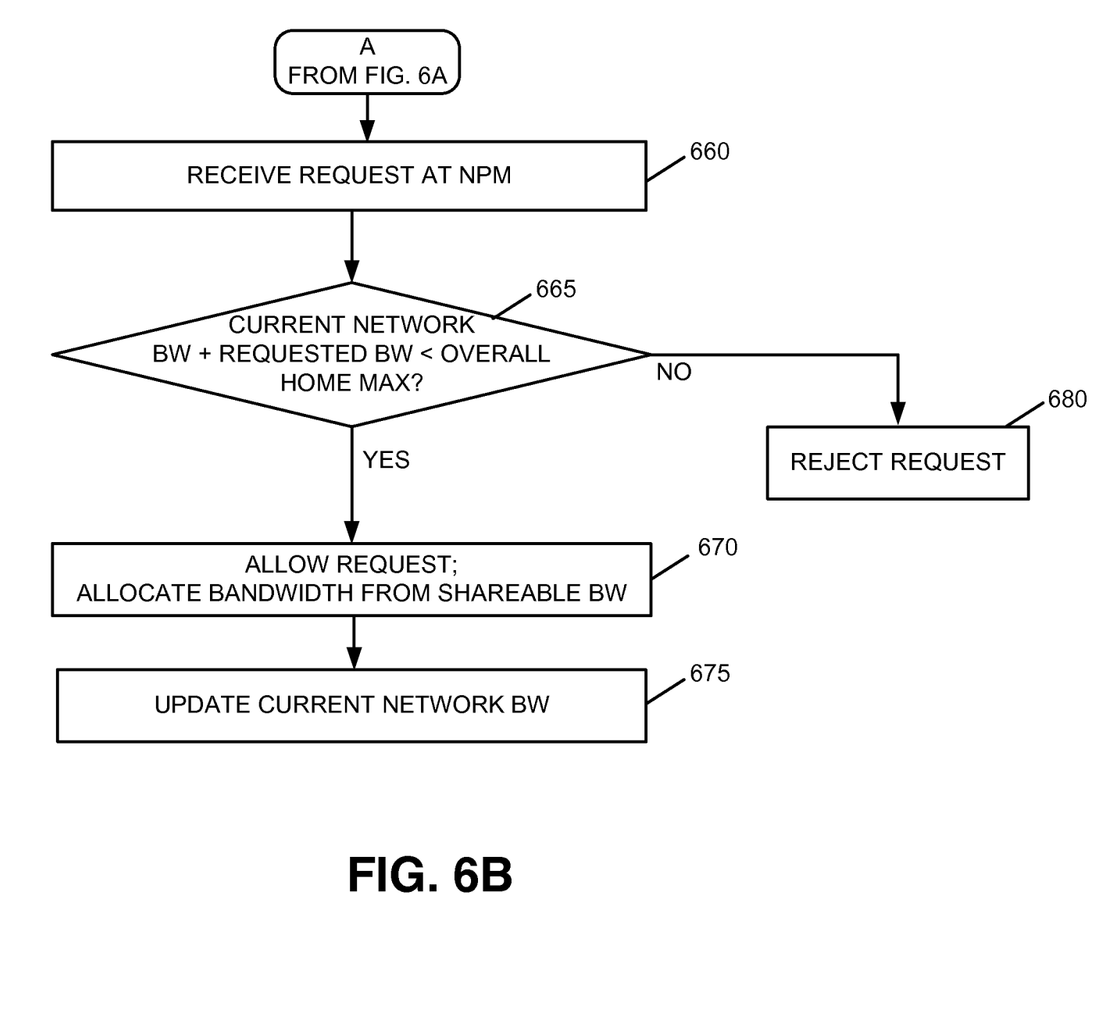

FIGS. 6A and 6B are flow diagrams illustrating exemplary processing associated with network 100. In this example, assume that a user at STB 120-1 would like to watch a movie, such as a high definition (HD) movie, stored on a device located within the customer's home, such as MDVR 125.

Processing may begin with BHR 210 booting up and receiving various bandwidth parameters from service provider 150 (act 610). For example, HRM 250 may transmit BW parameters to HPM 400 that include STB-STB local floor BW 520, Internet floor BW 530 and local maximum BW 560. In some implementations, HRM 250 may also transmit parameters to HPM 400 that identify network floor BW 510, network maximum BW 550, overall maximum BW 570, etc. HPM 400 may store this information in memory 330 (act 610). HRM 250 may also store network-related parameters in its memory. For example, HRM 250 may store network floor BW 510, network maximum BW 550 and overall maximum BW 570 in its memory.

Assume that a user at STB 120-1 accesses a graphical user interface (e.g., an Interactive Media Guide (IMG)) displaying a listing of programs/movies stored on MDVR 125. As described above, MDVR 125 may allow users at STBs 120 to access stored videos/programs. In this case, further assume that the user selects a particular movie stored on MDVR 125. In an exemplary implementation, the IMG stored on STB 120-1 may access a predefined application bandwidth table included with the IMG and/or stored elsewhere on STB 120-1 to determine the bandwidth requirements for the selected movie. As an example, the table may store information indicating that a standard definition movie may require a bandwidth of 9 megabits per second (Mb/s) and a high definition movie may require a bandwidth of 19 Mb/s. In each case, STB 120-1 (e.g., via the IMG stored on STB 120-1) may forward a bandwidth request for the selected video, referred to herein as stream S1, to HPM 400.

HPM 400 may receive the request (act 615). HPM 400 may determine whether the requested bandwidth associated with stream S1 plus the local bandwidth currently being used in the user's home network is less than local floor BW 520 (act 615). If so (act 620—yes), policy control logic 420 may allow the request. MDVR 125 may then provide the selected movie to STB 120-1. Bandwidth monitoring logic 430 may also update the local bandwidth currently being used to account for the requested bandwidth associated with stream S1 (act 625). That is, bandwidth monitoring logic 430 will update the local bandwidth currently being used in the user's home network to include the bandwidth associated with providing stream S1 to STB 120-1.

If, however, the requested bandwidth associated with stream S1 plus the local bandwidth currently being used is not less than local floor BW 520 (act 620—no), policy control logic 420 may determine whether the requested bandwidth plus the local bandwidth currently being used is greater than local maximum BW 560 (act 630). If so (act 630—yes), policy control logic 420 may reject the request (act 635). Otherwise (act 630—no), policy control logic 420 may determine whether the local bandwidth currently being used is less than local floor BW 520 (act 640).

If so (act 640—yes), HPM 400 may send the request associated with stream S1 to NPM 230 along with other information (act 645). For example, HPM 400 may send the request for bandwidth to NPM 230, along with information identifying a value corresponding to the bandwidth associated with stream S1 plus the local bandwidth currently being used minus local floor BW 520 (act 645) (e.g., local_req+local_current−local_floor). Transmitting this value allows NPM 230 to determine how much of shareable BW 540 may be needed to fulfill the request.

If, however, policy control logic 420 determines that the local bandwidth currently being used is not less than local floor BW 520 not (act 640—no), HPM 400 may send the information identifying the requested bandwidth associated with stream S1 to NPM 230 (act 650).

NPM 230 may receive the request (FIG. 6B, act 660). NPM 230 may then determine whether the network bandwidth currently being used plus the requested bandwidth associated with stream S1 is less than maximum BW 570 (act 665). If so (act 665—yes), NPM 230 may allow the request (act 670). In this case, NPM 230 may allocate bandwidth from shareable BW 540 to fulfill the request (act 670). In some implementations, the decision made by NPM 230 to allow the request may take into consideration other criteria, in addition to bandwidth availability. For example, if NPM 230 determines that bandwidth is available to fulfill the request (act 665—yes), NPM 230 may also look at other rules (e.g., business rules) associated with the particular customer to determine whether the request/session should be allowed. As an example, NPM 230 may determine that the customer has reached the limit regarding how many video sessions are simultaneously running at a given time at the customer's location and may disallow the request, regardless of overall bandwidth usage.

In this example, assume that the request is allowed. NPM 230 may signal HRM 400 that the request is granted. HRM 400 may then signal MDVR 125 to begin providing stream S1 to STB 120-1. NPM 230 may also update the current network bandwidth by accounting for the portion of shareable BW 540 being used to fulfill the request associated with stream S1 (act 675). For example, if stream S1 has a BW of 19 Mb/s, NPM 230 may add the BW associated with stream S1 (i.e., 19 Mb/s in this example) to the currently used network BW.

If NPM 230 determines that the requested bandwidth associated with stream Si plus the network bandwidth currently being used is not less than the maximum BW 570 (act 665—no), NPM 230 may reject the request (act 680). In this instance, NPM 230 may send a message indicating that the request is rejected to BHR 210. HPM 400 may receive the message from NPM 230 and forward a message to STB 120-1 indicating that the available bandwidth is inadequate to fulfill the request at this time. Alternatively, HPM 400 may provide the user at STB 120-1 with the option of receiving the video at a lower resolution level (e.g., a non-HD version) that would fit within the available bandwidth/resource capability.

In this manner, BHR 210 may actively manage bandwidth usage in the user's home network. As described above, in some instances, HPM 400 may make allocation decisions without contacting other devices in network 100. However, when the request may require use of a portion of shareable BW 540, BHR 210 may communicate with NPM 230 to ensure that bandwidth is available. Although not described above, after a user has completed accessing bandwidth, such as when the video session associated with stream S1 has ended, bandwidth monitoring logic 430 may update the bandwidth parameters. For example, bandwidth monitoring logic 430 may update the current local bandwidth being used to allow policy control logic 420 and/or NPM 230 to re-allocate the bandwidth associated with stream S1 to other devices.

Figure 7A:
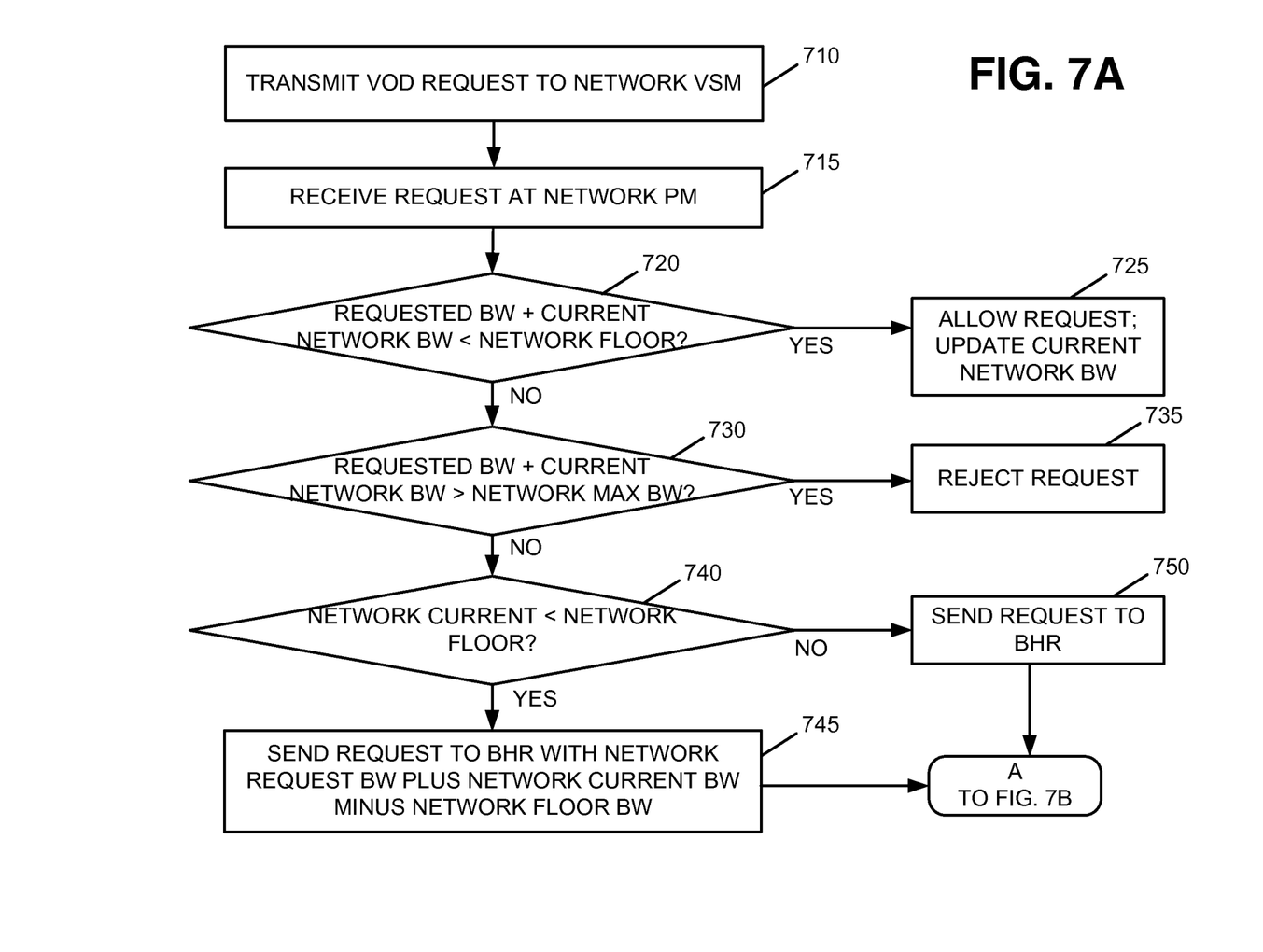
FIGS. 7A and 7B are flow diagrams illustrating exemplary processing by devices illustrated in FIG. 2 in accordance with another exemplary implementation.
Figure 7B:
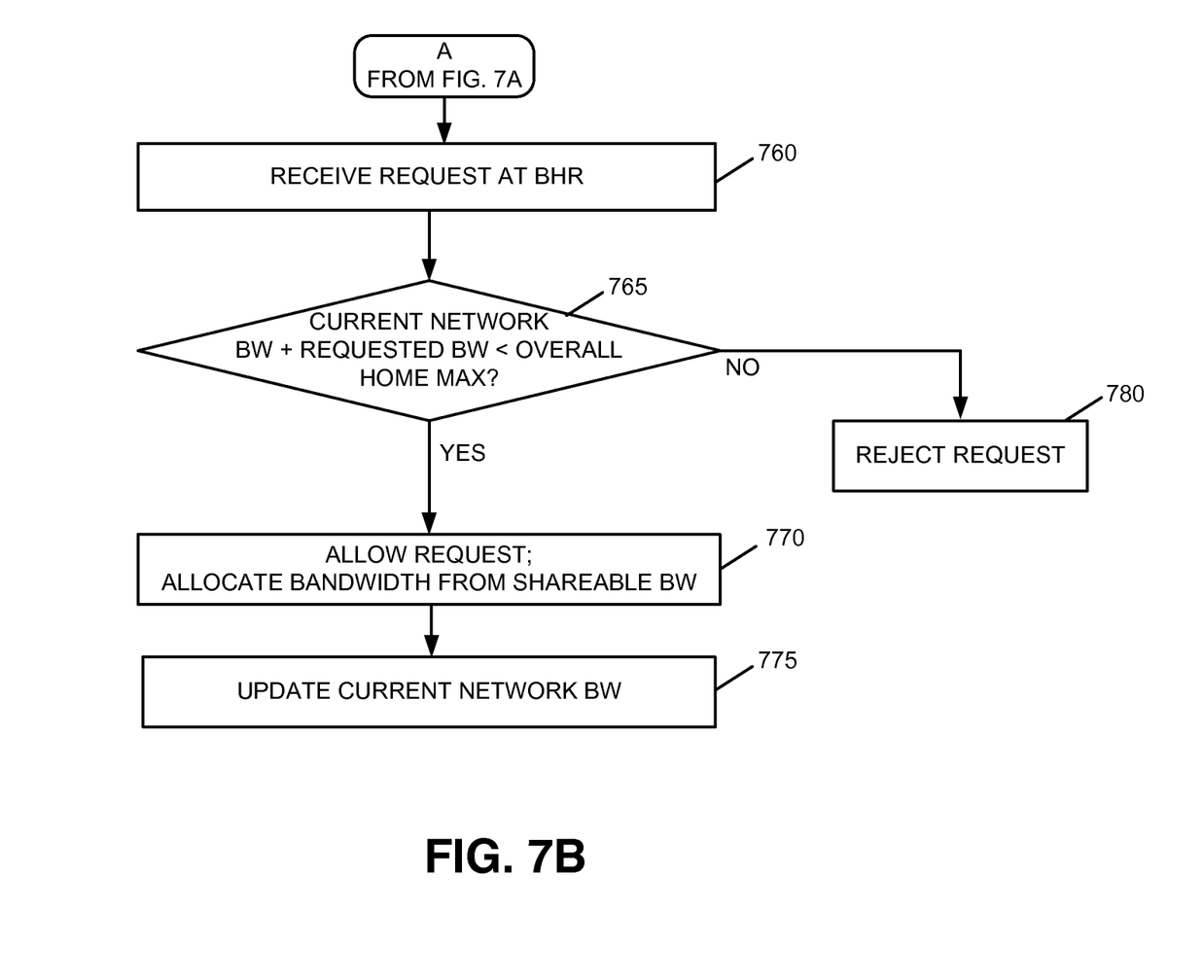

FIGS. 7A and 7B are flow diagrams illustrating exemplary processing with respect to provisioning a request for network traffic, such as a video-on-demand request. In this example, assume that BHR 210 has already booted up and received various bandwidth parameters from service provider 150 as described above with respect to FIG. 6A. Assume that a user at STB 120-1 accesses a GUI (e.g., an IMG) displaying a listing of programs/movies available via VSM 240. Further assume that the user selects a particular high definition movie available for video-on-demand. As described above, in an exemplary implementation, the IMG stored on STB 120-1 may access a predefined application bandwidth table included with the IMG and/or stored elsewhere on STB 120-1 to determine the bandwidth requirements for the selected movie. In each case, STB 120-1 (e.g., the IMG stored on STB 120-1) may forward a bandwidth request for the selected video, referred to herein as stream S2, to HPM 400.

HPM 400 may receive the request and forward the request to VSM 240 (act 710). NPM 230 may receive the request from VSM 240 (act 715). NPM 230 may determine whether the requested video bandwidth associated with stream S2 plus the network bandwidth currently being used is less than network floor BW 510 (act 720). If so (act 720—yes), NPM 230 may allow the request (act 725). In this case, NPM 240 may signal VSM 240 to provide the selected program/movie to BHR 210. NPM 230 may also update the network bandwidth currently being used to account for the requested bandwidth associated with stream S2 (act 725).

If, however, the requested video bandwidth associated with VOD stream S2 plus the network bandwidth currently being used is not less than network floor BW 510 (act 720—no), NPM 230 may determine whether the requested bandwidth plus the network bandwidth currently being used is greater than network maximum BW 570 (act 730). If so (act 730—yes), NPM 230 may reject the request (act 735). Otherwise (act 730—no), NPM 230 may determine whether the network bandwidth currently being used is less than network floor BW 510 (act 740).

If so (act 740—yes), NPM 230 may send the request to BHR 210 along with other information (act 745). For example, NPM 230 may send the request for bandwidth to BHR 210, along with information identifying a value corresponding to the bandwidth associated with stream S2 plus the network bandwidth currently being used minus network floor BW 510 (act 745) (e.g., network_req+network_current−network_floor). If the currently used network BW is not less than network floor BW 510 (act 740—no), NPM 230 may send the information identifying the requested bandwidth associated with stream S2 to BHR 210 (act 750).

BHR 210 may receive the request (FIG. 7B, act 760). Policy control logic 420 may then determine whether the requested network bandwidth associated with stream S2 plus the local bandwidth currently being used in the customer's home network is less than overall maximum BW 570 (act 765). If so (act 765—yes), policy control logic 420 may allow the request (act 770). Similar to the discussion above with respect to FIG. 6B, in some implementations, the decision made by BHR 210 to allow the request may take into consideration other criteria, in addition to bandwidth availability. For example, if BHR 210 determines that bandwidth is available to fulfill the request (act 665—yes), BHR 210 may also look at other rules (e.g., business rules) associated with the particular customer to determine whether the request/session should be allowed. As an example, BHR 210 may determine that the customer has reached the limit regarding how many video sessions are simultaneously running at a given time at the customer's location and may disallow the request, regardless of overall bandwidth usage. In some instances, BHR 210 may also look at a number of intermediate devices or hops located between the customer (i.e., BHR 210) and VSM 240 and investigate each hop or receive information from NPM 230 regarding each hop prior to making a yes-no decision for a request. For example, if a particular hop between VSM 240 and BHR 210 is congested or experiencing some problem with respect to forwarding video streams, BHR 210 may disallow the request.

In this example, assume that the request is allowed. HPM 400 may then signal NPM 230 that the request for stream S2 is approved. NPM 230 may signal VSM 240 to provide the requested video stream to BHR 210, which will forward the stream to STB 120-1. In this case, policy control logic 420 may allocate bandwidth from shareable BW 540 to fulfill the request (act 770). Bandwidth monitoring logic 430 may also update the local bandwidth currently being used to include the requested bandwidth (act 775). For example, bandwidth monitoring logic 430 may update the local bandwidth currently being used to include the bandwidth associated with providing stream S2.

If the requested video bandwidth associated with stream S2 plus the local bandwidth currently being used is not less than overall maximum BW 570 (act 765—no), policy control logic 420 may reject the request (act 780). In this case, policy control logic 420 may forward a message to STB 120-1 indicating that the available bandwidth is inadequate to fulfill the request at this time. Alternatively, policy control logic 420 may provide the user at STB 120-1 with the option of receiving the video at a lower resolution level (e.g., a non-HD version).

In this manner, NPM 230 may interact with BHR 210 to actively manage bandwidth usage in the user's home network. As described above, in some instances, NPM 230 may make allocation decisions without contacting other devices in network 100, while in other instances, NPM 230 may communicate with BHR 210 to determine whether bandwidth is available. In addition, similar to the discussion above with respect to FIGS. 6A and 6B, after a user has completed accessing bandwidth, such as when the video session associated with stream S2 has ended, NPM 230 and/or bandwidth monitoring logic 430 may update the bandwidth parameters. For example, NPM 230 may update the current network bandwidth being used to indicate that the bandwidth allocated to stream S2 is now available to be re-allocated to other devices. Bandwidth monitoring logic 430 may also update the current local bandwidth currently being used to allow policy control logic 420 to re-allocate the bandwidth associated with stream S2 to other devices.

As described above, network traffic may include VOD traffic provided by VSM 240 to the user's home network. Network traffic may also include IPTV traffic provided to a user device (e.g., one of user devices 140) in the user's home network. IPTV may entail multicasting of content, as opposed to a VOD stream or a STB-to-STB stream which are unicast. In some implementations, an IPTV stream may be replicated at and multicast from one or more of BNG 220, OLT 260 and BHR 210. As described above, in conventional systems, predetermined limits may be set for each type of traffic. For example, in a conventional system, 10 Mb/s may be reserved for IPTV traffic. In addition, conventional systems may treat IPTV in a similar manner as a VOD session. In such a scenario, every channel change associated with viewing IPTV would result in a request from the customer's home router to a network manager asking for permission to access the particular channel. Such an approach does not scale well when thousands of users are watching IPTV.

In accordance with an exemplary implementation, OLT 260 may act as an adjunct policy manager associated with accessing/viewing IPTV in the customer's home network. For example, processing associated with requesting IPTV streams may proceed in a manner similar to that described above with respect to FIGS. 6A and 6B, with the difference being that OLT 260 may perform the bandwidth allocation, as opposed to HPM 400 allocating bandwidth, as described in more detail below.

Figure 8:
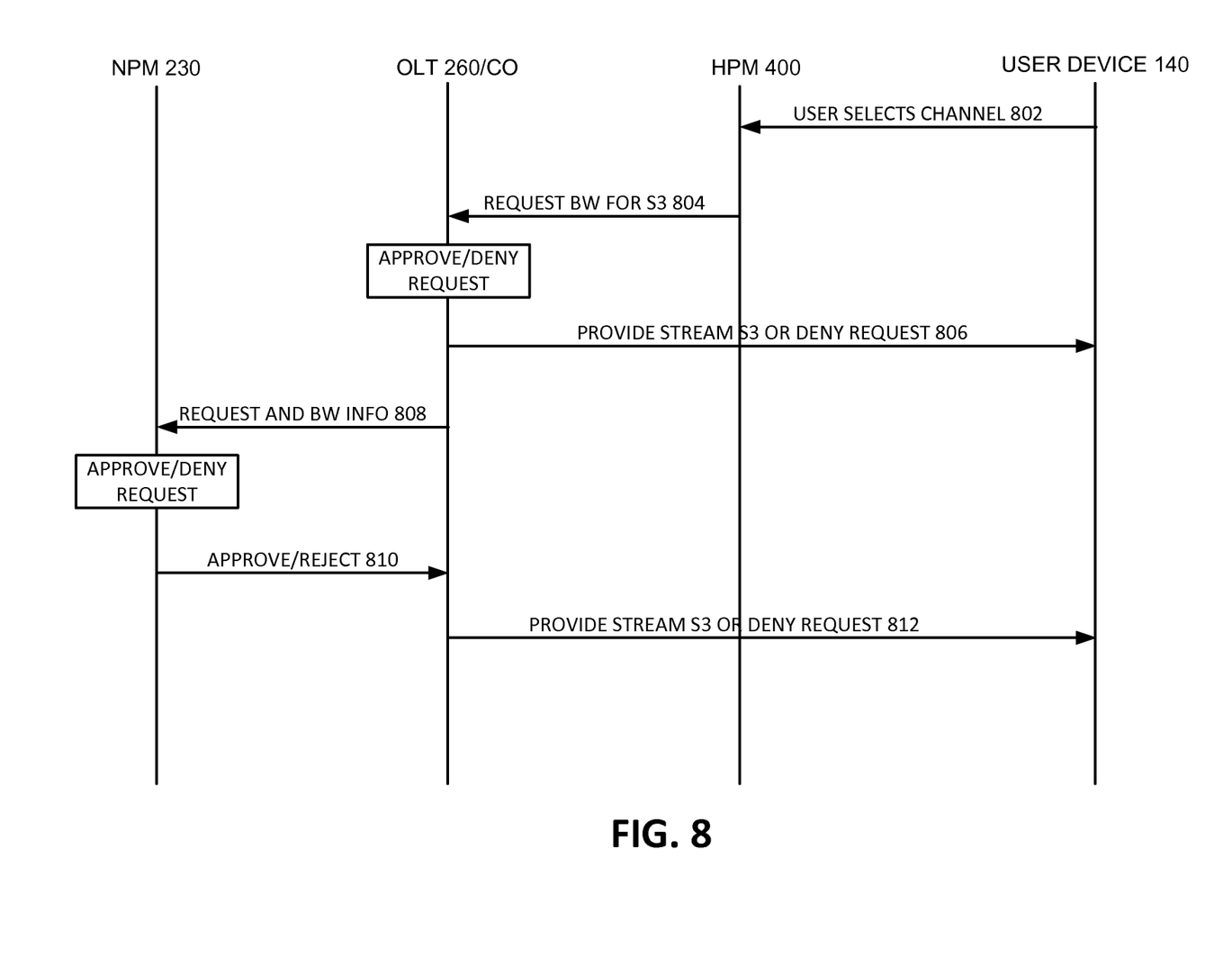
FIG. 8 is an exemplary signal flow diagram associated with processing by various devices illustrated in FIG. 2 in accordance with an exemplary implementation.

FIG. 8 illustrates a signal flow diagram associated with requesting/viewing IPTV. Referring to FIG. 8, a customer at user device 140-1 may interact with a user interface, such as a GUI stored on BHR 210 to request an IPTV programming channel (802). HPM 400 may forward a bandwidth request for the selected IPTV channel, referred to herein as stream S3, to OLT 260 or a central office (CO) associated with service provider 150 (804).

OLT 260 may execute an algorithm similar to that performed by policy control logic 420 described above with respect to FIG. 6A (e.g., acts 620-635) to determine whether the request should be granted or denied. In situations where OLT 260 is able to approve or rejection the request without consulting other devices in network 100, OLT 260 may provide stream S3 to user device 140-1 or send a message to user device 140-1 indicating that the request is rejected due to insufficient bandwidth (806).

In situations when OLT 260 is unable to make the determination whether to approve or reject the request without consulting another device (e.g., NPM 230), OLT 260 may determine whether the requested BW associated with stream S3 is less than local floor BW 520 and forward the request to NPM 230 along with additional information in a manner similar to that described with respect to acts 640-650 of FIG. 6A (808). For example, if the requested BW associated with stream S3 is less than local floor BW 520, OLT 260 may send the request for bandwidth to NPM 230, along with information identifying a value corresponding to the bandwidth associated with stream S3 plus the local bandwidth currently being used minus local floor BW 520 (e.g., IPTV_req+local_current−local_floor). If, however, OLT 260 determines that the local bandwidth currently being used is not less than local floor BW 520 not, OLT 260 may send the information identifying the requested bandwidth associated with stream S3 to NPM 230.

NPM 230 may then perform processing similar to that described above with respect to FIG. 6B to determine whether to approve or reject the request. NPM 230 may signal OLT 260 whether the request is approved or rejected (810). OLT 260 may receive the determination and provide stream S3 to user device 140-1 or send a message to user device 140-1 indicating that the request is rejected due to insufficient bandwidth (812).

In this manner, OLT 260 may act as an adjunct or auxiliary policy manager to allocate bandwidth for IPTV streams. In situations where a user is receiving IPTV programming and changes the channel, OLT 260 may not need to consult NPM 230 for approval unless the requested bandwidth exceeds the available amounts and shareable BW 540 may be needed to fulfill the request. For example, if a party at user device 140-1 is receiving stream S3 that corresponds to Channel 4 and switches to Channel 5, OLT 260 may simply approve the request as long as the bandwidth requirements associated with Channel 5 do not exceed one of the predetermined limits discussed above. If the bandwidth parameters associated with the different IPTV channels are different (e.g., one of the channels is a high definition channel and other channels are standard definition), OLT 260 may perform processing similar to that described above with respect to FIGS. 6A and 6B to determine whether to approve the request.

In this manner, IPTV streams that are multicast to various end user devices may be treated in a manner similar to requests involving local traffic (e.g., STB-STB traffic). This helps reduce signaling to a network policy manager, such as NPM 230, when a user is channel surfing IPTV channels. In addition, similar to the discussion above with respect to FIGS. 6A-7B, after a user has stopped accessing/viewing IPTV corresponding to stream S3, bandwidth monitoring logic 430 may update the current local bandwidth currently being used to allow policy control logic 420 and/or NPM 230 to reallocate the bandwidth associated with stream S3 to other devices.

Implementations described herein provide network bandwidth management for a customer's home network. Distributing some or all or some of the management decisions to a device in the user's home network may reduce overhead in the network. For example, distributing bandwidth allocation decisions may reduce signaling to the network policy manager. In addition, distributing some or all of the decision making may result in a reduced time needed to fulfill various customer requests.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, all or some of the decision-making with respect to managing a customer's home network was distributed among various devices (e.g., BHR 210, OLT 260 and NPM 230). In other implementations, some of the decision-making described as being performed at BHR 210, OLT 260 or NPM 230 may be performed by another one of these devices or a different device. In addition, although BHR 210 is described as performing some of the bandwidth allocation in the user's home network, in other implementations, other devices in the user's home network (e.g., one of STBs 120, DVR 125, user device 140, ECB 215, etc.) may perform the bandwidth allocation.

In addition, processing described above generally referred to allocating traffic between two type types of traffic (e.g., managed video/network traffic and Internet/best effort traffic). In other implementations, more than two different types of traffic may be handled in a similar manner. For example, multiple classes of managed traffic may be processed in a manner similar to that described above with respect to FIGS. 6A-7B based on the particular criteria established between a service provider and the customer.

Further, features have been described above with respect to STBs 120, DVRs 125 and user devices 140 consuming bandwidth. In addition, other devices, such as a camera used for home monitoring, may compete for network bandwidth. Still further, other devices (e.g., a Slingbox®) that send television content to one of televisions 110 may compete for network bandwidth. In each case, HPM 400, OLT 260 and/or NPM 230 may manage requests for bandwidth, as described in detail above.

In addition, while series of acts have been described with respect to FIGS. 6A, 6B, 7A and 7B, and a series of signal flows have been described with respect to FIG. 8, the order of the acts and/or signal flows may be varied in other implementations. Moreover, non-dependent acts and/or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

storing, at a first network device configured to communicate with at least one set top box (STB) and at least one digital video recorder (DVR), information identifying a plurality of parameters associated with allocating bandwidth in a home network, the bandwidth being allocated among at least a local class of traffic and a network class of traffic and wherein at least a portion of the bandwidth is shareable between the local class of traffic and the network class of traffic;

receiving, at the first network device, a request having a corresponding first bandwidth and being associated with a first class of traffic;

determining, by the first network device, whether the first bandwidth plus currently used bandwidth associated with the first class of traffic is less than a reserved bandwidth associated with the first class of traffic, wherein the reserved bandwidth corresponds to a minimum bandwidth that is reserved for the first class of traffic and that cannot be shared with other classes of traffic;

approving the request, by the first network device, when the first bandwidth plus currently used bandwidth associated with the first class of traffic is less than the reserved bandwidth associated with the first class of traffic;

determining by the first network device, when the first bandwidth plus the currently used bandwidth associated with the first class of traffic is not less than the reserved bandwidth associated with the first class of traffic, whether the first bandwidth plus the currently used bandwidth associated with the first class of traffic is greater than a maximum bandwidth associated with the first class of traffic;

rejecting the request, by the first network device, when the first bandwidth plus the currently used bandwidth associated with the first class of traffic is greater than the maximum bandwidth associated with the first class of traffic; and determining, when the first bandwidth plus the currently used bandwidth associated with the first class of traffic is not greater than the maximum bandwidth associated with the first class of traffic, whether a portion of the shareable bandwidth is available to fulfill the request, wherein the determining whether a portion of the shareable bandwidth is available to fulfill the request comprises:

forwarding the request to a second network device located remotely from the home network, and determining, by the second network device, whether to approve the request.

2. The method of claim 1, wherein when the first class of traffic corresponds to local traffic, the first network device corresponds to a first device located in the home network and the second network device corresponds to a second device located remotely from the home network.

3. The method of claim 1, wherein when the first class of traffic corresponds to network traffic, the first network device corresponds to a first device located remotely from the home network and the second network device corresponds to a second device located in the home network.

4. The method of claim 1, wherein when the request corresponds to a request for Internet protocol television programming, the first network device corresponds to an optical line terminal or a device located in a central office, and receiving a request having a corresponding first bandwidth comprises:
receiving the request at the optical line terminal or the central office.

5. The method of claim 1, wherein the plurality of parameters comprises:
the maximum bandwidth associated with the first class of traffic, and
the minimum bandwidth reserved for the first class of traffic, wherein the minimum bandwidth is less than the maximum bandwidth.

6. A method, comprising:
storing, at a first network device configured to communicate with at least one set top box (STB) and at least one digital video recorder (DVR), information identifying a plurality of parameters associated with allocating bandwidth in a home network, the bandwidth being allocated among at least a local class of traffic and a network class of traffic and wherein at least a portion of the bandwidth is shareable between the local class of traffic and the network class of traffic;
receiving, at the first network device, a request having a corresponding first bandwidth and being associated with a first class of traffic;
determining, by the first network device, whether the first bandwidth plus currently used bandwidth associated with the first class of traffic is less than a reserved bandwidth associated with the first class of traffic, wherein the reserved bandwidth corresponds to a minimum bandwidth that is reserved for the first class of traffic and that cannot be shared with other classes of traffic;
approving the request, by the first network device, when the first bandwidth plus currently used bandwidth associated with the first class of traffic is less than the reserved bandwidth associated with the first class of traffic;
determining by the first network device, when the first bandwidth plus the currently used bandwidth associated with the first class of traffic is not less than the reserved bandwidth associated with the first class of traffic, whether the first bandwidth plus the currently used bandwidth associated with the first class of traffic is greater than a maximum bandwidth associated with the first class of traffic;
rejecting the request, by the first network device, when the first bandwidth plus the currently used bandwidth associated with the first class of traffic is greater than the maximum bandwidth associated with the first class of traffic; and
determining, when the first bandwidth plus the currently used bandwidth associated with the first class of traffic is not greater than the maximum bandwidth associated with the first class of traffic, whether a portion of the shareable bandwidth is available to fulfill the request,
wherein the determining whether a portion of the shareable bandwidth is available to fulfill the request comprises:
determining, by the first network device, whether the currently used bandwidth associated with the first class of traffic is less than the reserved bandwidth associated with the first class of traffic, and
forwarding the request to a second network device along with second bandwidth information, the second bandwidth information corresponding to:
the first bandwidth plus the currently used bandwidth associated with the first class of traffic minus the reserved bandwidth associated with the first class of traffic, when the currently used bandwidth associated with the first class of traffic is less than the reserved bandwidth associated with the first class of traffic, and
the first bandwidth, when the currently used bandwidth associated with the first class of traffic is not less than the reserved bandwidth associated with the first class of traffic, and
determining, by the second network device, whether to approve the request.

7. The method of claim 6, wherein the determining whether a portion of the shareable bandwidth is available to fulfill the request further comprises:
determining, by the second network device, whether currently used bandwidth associated with a second class of traffic plus the second bandwidth is less than an overall maximum allowed bandwidth,
allowing the request when the currently used bandwidth associated with the second class of traffic plus the second bandwidth is less than the overall maximum allowed bandwidth, and
rejecting the request when the currently used bandwidth associated with the second class of traffic plus the second bandwidth is not less than the overall maximum allowed bandwidth.

8. The method of claim 7, wherein the first class of traffic corresponds to one of the local class of traffic or the network class of traffic, and the second class of traffic corresponds to the other one of the local class of traffic or the network class of traffic.

9. The method of claim 7, further comprising:
adjusting, by the second network device, an available bandwidth associated with the second class of traffic, in response to allowing the request.

10. A device, comprising:
a memory configured to store a plurality of parameters associated with allocating bandwidth in a home network, the bandwidth being allocated among at least a local class of traffic and a network class of traffic, and wherein at least a portion of the bandwidth is shareable between the local class of traffic and the network class of traffic;
a communication interface configured to:
receive requests for access to bandwidth from a plurality of devices, the plurality of devices including at least one set top box (STB) and at least one digital video recorder (DVR); and
logic configured to:
receive a first request having a corresponding first bandwidth and being associated with a first class of traffic,
determine whether the first bandwidth plus currently used bandwidth associated with the first class of traffic is less than a reserved bandwidth associated with the first class of traffic, wherein the reserved bandwidth corresponds to a minimum bandwidth that is reserved for the first class of traffic and that cannot be shared with other classes of traffic, approve the first request in response to determining that the first bandwidth plus currently used bandwidth associated with the first class of traffic is less than the reserved bandwidth associated with the first class of traffic, forward, in response to determining that the first bandwidth plus the currently used bandwidth associated with the first class of traffic is not greater than a maximum bandwidth associated with the first class of traffic, the first request to a second device located remotely from the home network to determine whether a portion of the shareable bandwidth is available to fulfill the first request, and receive, from the second device via the communication interface, information indicating whether to approve or reject the first request.

11. The device of claim 10, wherein when forwarding the first request to a second device, the logic is further configured to:

forward information identifying a value corresponding to the first bandwidth plus the currently used bandwidth associated with the first class of traffic minus the reserved bandwidth associated with the first class of traffic, in response to determining that the currently used bandwidth associated with the first class of traffic is less than the reserved bandwidth associated with the first class of traffic.

12. The device of claim 11, wherein when forwarding the first request to a second device, the logic is further configured to forward information identifying a value corresponding to the first bandwidth, in response to determining that the currently used bandwidth associated with the first class of traffic is not less than the reserved bandwidth associated with the first class of traffic.

13. The device of claim 10, wherein when the first request corresponds to a request for local traffic between the at least one STB and the at least one DVR, the device comprises a router or a set top box located in a home network.

14. The device of claim 10, wherein when the first request corresponds to a request for video on demand traffic, the device comprises a network device located at a facility associated with a service provider that provides programming to the at least one STB or the at least one DVR.

15. The device of claim 10, wherein when the first request corresponds to a request for Internet protocol television, the device comprises an optical line terminal or a device located in a central office.

16. A non-transitory computer-readable medium having stored thereon sequences of instructions which, when executed by at least one processor, cause the at least one processor to:

store a plurality of parameters associated with managing bandwidth in a home network;

receive a first request having a corresponding first bandwidth and being associated with a first class of traffic;

determine whether the first bandwidth plus currently used bandwidth associated with the first class of traffic is less than a reserved bandwidth associated with the first class of traffic, wherein the reserved bandwidth corresponds to a minimum bandwidth that is reserved for the first class of traffic and that cannot be shared with other classes of traffic;

approve the first request in response to determining that the first bandwidth plus currently used bandwidth associated with the first class of traffic is less than the reserved bandwidth associated with the first class of traffic;

forward, in response to determining that the first bandwidth plus the currently used bandwidth associated with the first class of traffic is not greater than a maximum bandwidth associated with the first class of traffic, the first request to a device located remotely from the home network to determine whether a portion of shareable bandwidth is available to fulfill the first request; and receive, from the device located remotely from the home network, information indicating whether to approve or reject the first request.

17. The non-transitory computer-readable medium of claim 16, further including instructions for causing the at least one processor to:

forward second bandwidth information to the device located remotely from the home network along with the first request, the second bandwidth information corresponding to:

the first bandwidth plus the currently used bandwidth associated with the first class of traffic minus the reserved bandwidth associated with the first class of traffic, in response to determining that the currently used bandwidth associated with the first class of traffic is less than the reserved bandwidth associated with the first class of traffic, and the first bandwidth, in response to determining that the currently used bandwidth associated with the first class of traffic is not less than the reserved bandwidth associated with the first class of traffic.

* * * * *